US007121189B2

(12) United States Patent
Vonderwell et al.

(10) Patent No.: US 7,121,189 B2
(45) Date of Patent: Oct. 17, 2006

(54) ELECTRONICALLY AND HYDRAULICALLY-ACTUATED DRAIN VALUE

(75) Inventors: Mark P. Vonderwell, Dunlap, IL (US); Yun Guo, Peoria, IL (US); Mikhall A. Sorokine, Naperville, IL (US); Aleksandar M Egelja, Naperville, IL (US); Pengfei Ma, Naperville, IL (US)

(73) Assignees: Caterpillar Inc., Peoria, IL (US); Shin Caterpillar Mitsubishi Ltd, (JP)

( * ) Notice: Subject to any disclaimer, the term of this patent is extended or adjusted under 35 U.S.C. 154(b) by 133 days.

(21) Appl. No.: 10/998,616

(22) Filed: Nov. 30, 2004

(65) Prior Publication Data

US 2006/0065867 A1 Mar. 30, 2006

Related U.S. Application Data

(60) Provisional application No. 60/614,343, filed on Sep. 29, 2004.

(51) Int. Cl.
*F16K 31/12* (2006.01)

(52) U.S. Cl. .......................................... 91/529; 91/459

(58) Field of Classification Search .................. 91/446, 91/451, 452, 459, 468, 526, 529, 530; 251/26, 251/27, 30.01, 31, 50

See application file for complete search history.

(56) References Cited

U.S. PATENT DOCUMENTS 3,366,202 A 1/1968 James
3,613,717 A 10/1971 Smith
4,046,270 A 9/1977 Baron et al.
4,222,409 A 9/1980 Budzich
4,250,794 A 2/1981 Haak et al.
4,416,187 A 11/1983 Nystrom
4,437,385 A 3/1984 Kramer et al.
4,480,527 A 11/1984 Lonnemo
4,581,893 A 4/1986 Lindbom
4,586,330 A 5/1986 Watanabe et al.
4,619,186 A 10/1986 Walters
4,623,118 A 11/1986 Kumar
4,662,601 A 5/1987 Andersson
4,706,932 A 11/1987 Yoshida et al.
4,747,335 A 5/1988 Budzich
4,799,420 A 1/1989 Budzich (Continued)

FOREIGN PATENT DOCUMENTS

GB 1 360 082 7/1974

(Continued)

*Primary Examiner*—Thomas E. Lazo
(74) *Attorney, Agent, or Firm*—Finnegan, Henderson, Farabow, Garrett&Dunner; D. James Barnes; Michael S. King

(57) ABSTRACT

A valve for a fluid circuit is disclosed. The valve has a main valve element with a first end and a second end. The main valve element is movable between a flow-passing and a flow-blocking position in response to fluid pressure exerted on the first and second ends. The valve also has a solenoid mechanism operatively associated with the main valve element to move the main valve element toward one of the flow-passing and the flow-blocking positions. The valve further has a main valve spring configured to bias the main valve element in opposition to movement caused by the solenoid mechanism. The valve additionally has a relief valve element configured to communicate a fluid with the first end of the main valve element in response to a fluid pressure to initiate movement of the main valve element.

34 Claims, 4 Drawing Sheets

U.S. PATENT DOCUMENTS

| | | | |
|---|---|---|---|
| 5,067,519 | A | 11/1991 | Russell et al. |
| 5,152,142 | A | 10/1992 | Budzich |
| 5,211,196 | A | 5/1993 | Schwelm |
| 5,287,794 | A | 2/1994 | Andersson |
| 5,297,381 | A | 3/1994 | Eich et al. |
| 5,313,873 | A | 5/1994 | Gall et al. |
| 5,350,152 | A | 9/1994 | Hutchison et al. |
| 5,366,202 | A | 11/1994 | Lunzman |
| 5,477,677 | A | 12/1995 | Krnavek |
| 5,490,384 | A | 2/1996 | Lunzman |
| 5,537,818 | A | 7/1996 | Hosseini et al. |
| 5,553,452 | A | 9/1996 | Snow et al. |
| 5,560,387 | A | 10/1996 | Devier et al. |
| 5,564,673 | A | 10/1996 | Pieren |
| 5,568,759 | A | 10/1996 | Aardema |
| 5,678,470 | A | 10/1997 | Koehler et al. |
| 5,701,933 | A | 12/1997 | Lunzman |
| 5,813,226 | A | 9/1998 | Krone |
| 5,868,059 | A | 2/1999 | Smith |
| 5,878,647 | A | 3/1999 | Wilke et al. |
| 5,880,957 | A | 3/1999 | Aardema et al. |
| 5,947,140 | A | 9/1999 | Aardema et al. |
| 5,960,695 | A | 10/1999 | Aardema et al. |
| 6,009,708 | A | 1/2000 | Miki et al. |
| 6,216,456 | B1 | 4/2001 | Mitchell |
| 6,282,891 | B1 | 9/2001 | Rockwood |
| 6,398,182 | B1 | 6/2002 | Stephenson |
| 6,467,264 | B1 | 10/2002 | Stephenson et al. |
| 6,498,973 | B1 | 12/2002 | Dix et al. |
| 6,502,393 | B1 | 1/2003 | Stephenson et al. |
| 6,502,500 | B1 | 1/2003 | Yoshino |
| 6,598,391 | B1 | 7/2003 | Lunzman et al. |
| 6,619,183 | B1 | 9/2003 | Yoshino |
| 6,655,136 | B1 | 12/2003 | Holt et al. |
| 6,662,705 | B1 | 12/2003 | Huang et al. |
| 6,691,603 | B1 | 2/2004 | Linerode et al. |
| 6,694,860 | B1 | 2/2004 | Yoshino |
| 6,715,402 | B1 | 4/2004 | Pfaff et al. |
| 6,718,759 | B1 | 4/2004 | Tabor |
| 6,725,131 | B1 | 4/2004 | Lunzman |
| 6,732,512 | B1 | 5/2004 | Pfaff et al. |
| 6,748,738 | B1 | 6/2004 | Smith |
| 6,761,029 | B1 | 7/2004 | Linerode |
| 2003/0084946 | A1 | 5/2003 | Douglass et al. |
| 2003/0121256 | A1 | 7/2003 | Mathur |
| 2004/0055288 | A1 | 3/2004 | Pfaff et al. |
| 2004/0055289 | A1 | 3/2004 | Pfaff et al. |
| 2004/0055452 | A1 | 3/2004 | Tabor |
| 2004/0055453 | A1 | 3/2004 | Tabor |
| 2004/0055454 | A1 | 3/2004 | Pfaff et al. |
| 2004/0055455 | A1 | 3/2004 | Tabor et al. |

FOREIGN PATENT DOCUMENTS

| | | | |
|---|---|---|---|
| JP | 02613041 | B2 | 5/1997 |

ELECTRONICALLY AND HYDRAULICALLY-ACTUATED DRAIN VALUE

RELATED APPLICATIONS

This application claims the benefit of U.S. Provisional Patent Application No. 60/614,343, entitled "Hybrid Electronic/Pilot-Operated Line Relief," which was filed on Sep. 29, 2004.

TECHNICAL FIELD

The present disclosure relates generally to a drain valve, and more particularly, to a drain valve that is both electronically and hydraulically actuated.

BACKGROUND

Work machines such as, for example, dozers, loaders, excavators, motor graders, and other types of heavy machinery use one or more hydraulic actuators to accomplish a variety of tasks. These actuators are selectively fluidly connected to a pump on the work machine that provides pressurized fluid to chambers within the actuators, and to a tank to allow the pressurized fluid to drain from the actuators. A valve arrangement is typically fluidly connected between the actuators and the pump and tank to control a flow rate and direction of pressurized fluid to and from the chambers of the actuators.

The portion of the valve arrangement connecting the actuator to the tank is called a drain valve. The drain valve typically includes a solenoid operated electronic flow controlling valve or a hydraulic pressure limiting valve. The electronic flow controlling valve has a valve element that is movable against a spring bias between a flow-passing and a flow-blocking position in response to an electronic signal to control a flow of pressurized fluid to an actuator. The hydraulic pressure limiting valve generally includes a valve element that is spring biased toward a flow-blocking position and movable toward a flow-passing position in response to a fluid pressure exerted against the valve element to limit a maximum pressure within the actuator.

A system having one of the electronic flow controlling and hydraulic pressure limiting valves can be problematic, while a valve arrangement having both the electronic flow controlling and hydraulic pressure limiting valves can be large and expensive. For example, the hydraulic pressure limiting valve does not afford the controllability of the electronic flow controlling valve, while the electronic flow controlling valve can not afford pressure limiting functions during electrical failure or system shut down and is not as responsive as the hydraulic pressure limiting valve. One method of providing the benefits of both the electronic flow controlling and hydraulic pressure limiting valves is described in U.S. Pat. No. 5,878,647 (the '647 patent) issued to Wilke et al. on Mar. 9, 1999. The '647 patent describes a hydraulic circuit having two pairs of valves, a variable displacement pump, a reservoir tank, and a hydraulic actuator. One pair of the valves includes a head-end supply valve and a head-end return valve that connects a head end of the hydraulic actuator to either the variable displacement pump or the reservoir tank. The other pair of solenoid valves includes a rod-end supply valve and a rod-end return valve that connects a rod end of the hydraulic actuator to either the variable displacement pump or the reservoir tank. Each of the head and rod-end return valves includes a solenoid operated pilot valve element that selectively communicates fluid from the hydraulic actuator to a hydraulically operated valve element. When both the solenoid operated pilot valve element and the hydraulically operated valve element are in a flow-passing position, fluid from the hydraulic actuator is allowed to drain from the hydraulic actuator to the reservoir tank.

Although the return valves of the hydraulic circuit described in the '647 patent may provide some of the benefits associated with both electronic flow controlling and hydraulic pressure limiting valves, the return valves of the '647 patent may still be problematic. For example, in the situation of electrical failure or system shut down, the return valves of the '647 patent do not perform any pressure limiting functions. Further, because flow through the return valves can be completely blocked by high fluid pressures acting on the hydraulically operated valve element, the hydraulic circuit of the '647 patent lacks control. In addition, excessive pressures within the hydraulic circuit of the '647 patent tend to move the hydraulically operated valve element toward a flow-blocking position rather than a flow-passing position, thereby allowing the excessive pressures to increase even further.

The disclosed valve is directed to overcoming one or more of the problems set forth above.

SUMMARY OF THE INVENTION

In one aspect, the present disclosure is directed to a valve. The valve includes a main valve element with a first end and a second end. The main valve element is movable between a flow-passing and a flow-blocking position in response to fluid pressure exerted on the first and second ends. The valve also includes a solenoid mechanism operatively associated with the main valve element to move the main valve element toward one of the flow-passing and the flow-blocking positions. The valve further includes a main valve spring configured to bias the main valve element in opposition to movement caused by the solenoid mechanism. The valve additionally includes a relief valve element configured to communicate a fluid with the first end of the main valve element in response to a fluid pressure to initiate movement of the main valve element.

In another aspect, the present disclosure is directed to a method of operating a valve. The method includes operating a relief valve element to selectively allow pressurized fluid to flow to an end of a main valve element, thereby moving the main valve element between a flow-passing and a flow-blocking position. The method also includes operating a solenoid to move the main valve element toward one of the flow-blocking and flow-passing positions in opposition to a spring bias.

DETAILED DESCRIPTION

Figure 1:
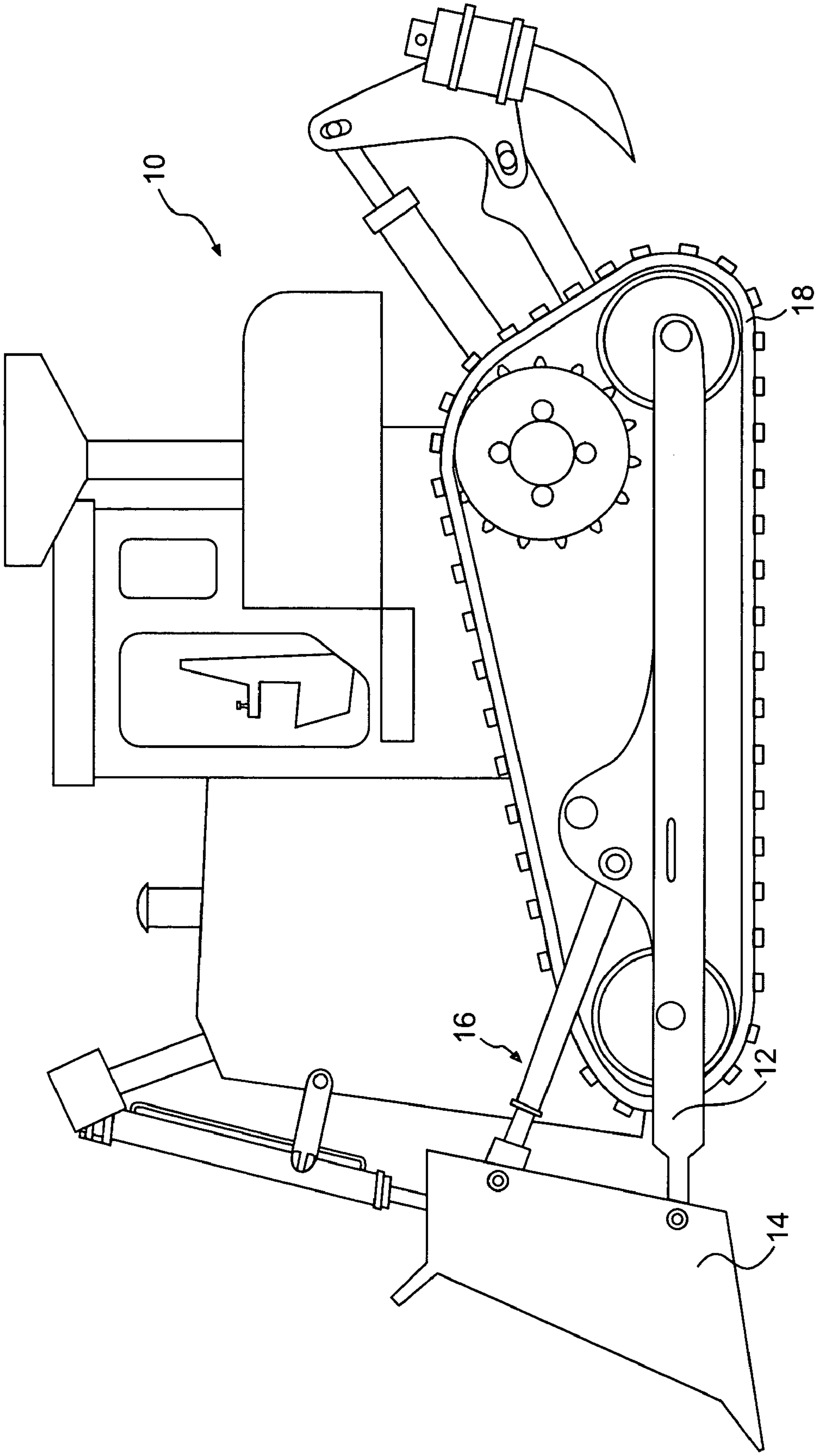
FIG. 1 is a side-view diagrammatic illustration of a work machine according to an exemplary disclosed embodiment.

FIG. 1 illustrates an exemplary work machine 10. Work machine 10 may be a fixed or mobile machine that performs some type of operation associated with an industry such as mining, construction, farming, or any other industry known in the art. For example, work machine 10 may be an earth moving machine such as a dozer, a loader, a backhoe, an excavator, a motor grader, a dump truck, or any other earth moving machine. Work machine 10 may also include a generator set, a pump, a marine vessel, or any other suitable operation-performing work machine. Work machine 10 may include a frame 12, at least one work implement 14, and a hydraulic cylinder 16 connecting work implement 14 to frame 12.

Frame 12 may include any structural unit that supports movement of work machine 10. Frame 12 may be, for example, a stationary base frame connecting a power source (not shown) to a traction device 18, a movable frame member of a linkage system, or any other frame known in the art.

Work implement 14 may include any device used in the performance of a task. For example, work implement 14 may include a blade, a bucket, a shovel, a ripper, a dump bed, a propelling device, or any other task-performing device known in the art. Work implement 14 may be connected to frame 12 via a direct pivot, via a linkage system with hydraulic cylinder 16 forming one member in the linkage system, or in any other appropriate manner. Work implement 14 may be configured to pivot, rotate, slide, swing, or move relative to frame 12 in any other manner known in the art.

Figure 2:
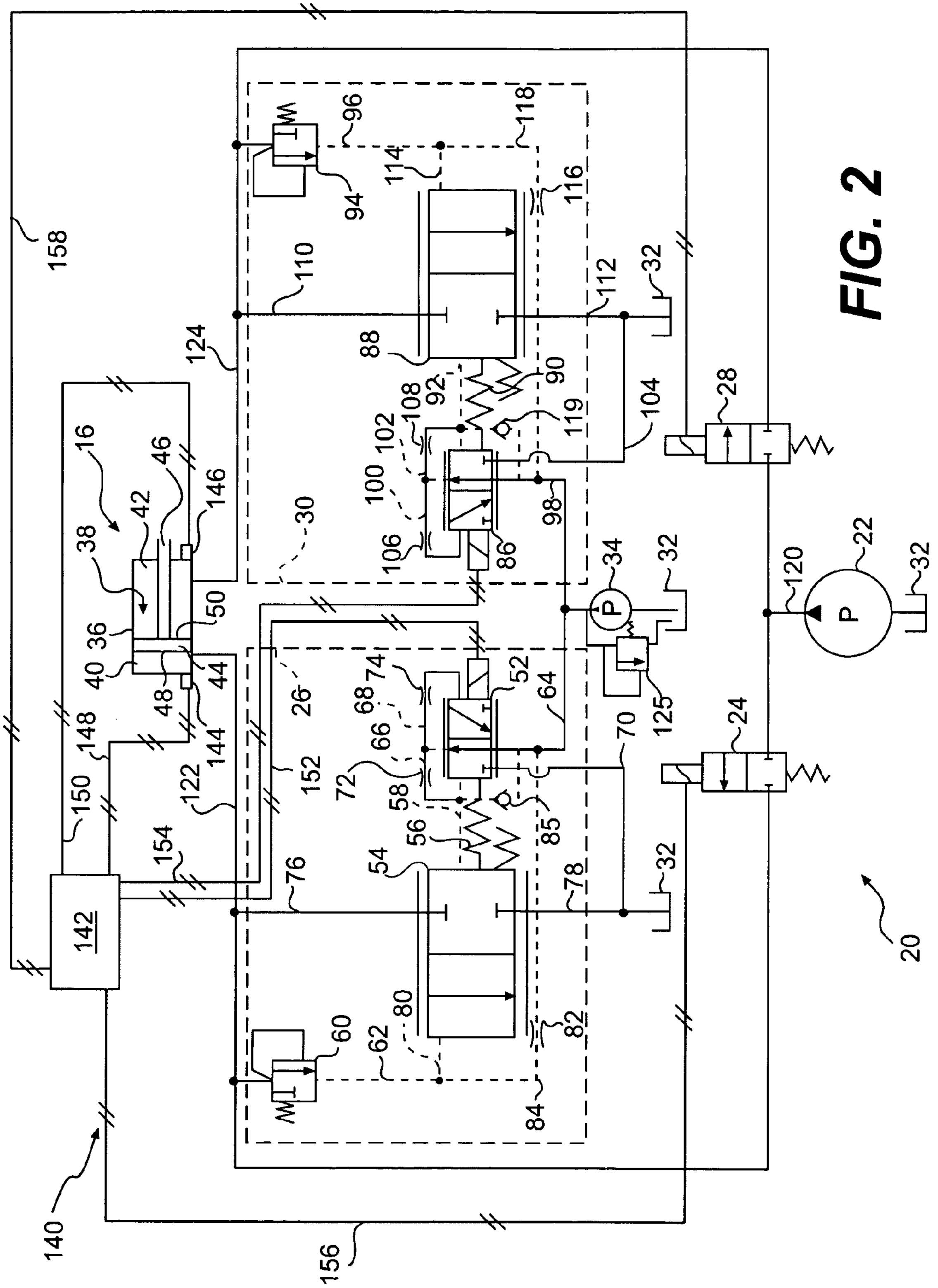
FIG. 2 is a schematic illustration of hydraulic circuit for the work machine of FIG. 1.

As illustrated in FIG. 2, hydraulic cylinder 16 may be one of various components within a hydraulic system 20 that cooperate to move work implement 14. Hydraulic system 20 may include a primary source 22 of pressurized fluid, a head-end supply valve 24, a head-end drain valve 26, a rod-end supply valve 28, a rod-end drain valve 30, a tank 32, and a pilot source 34 of pressurized fluid. It is contemplated that hydraulic system 20 may include additional and/or different components such as, for example, make up valves, pressure relief valves, pressure sensors, temperature sensors, position sensors, controllers, accumulators, and other components known in the art.

Hydraulic cylinder 16 may include a tube 36 and a piston assembly 38 disposed within tube 36. One of tube 36 and piston assembly 38 may be pivotally connected to frame 12, while the other of tube 36 and piston assembly 38 may be pivotally connected to work implement 14. It is contemplated that tube 36 and/or piston assembly 38 may alternately be fixedly connected to either frame 12 or work implement 14. Hydraulic cylinder 16 may include a first chamber 40 and a second chamber 42 separated by piston assembly 38. First and second chambers 40, 42 may be selectively supplied with a fluid pressurized by primary source 22 and fluidly connected with tank 32 to cause piston assembly 38 to displace within tube 36, thereby changing the effective length of hydraulic cylinder 16. The expansion and retraction of hydraulic cylinder 16 may function to assist in moving work implement 14.

Piston assembly 38 may include a piston 44 axially aligned with and disposed within tube 36, and a piston rod 46 connectable to one of frame 12 and work implement 14 (referring to FIG. 1). Piston 44 may include a first hydraulic surface 48 and a second hydraulic surface 50 opposite first hydraulic surface 48. An imbalance of force caused by fluid pressure on first and second hydraulic surfaces 48, 50 may cause piston assembly 38 to axially move within tube 36. For example, a force on first hydraulic surface 48 being greater than a force on second hydraulic surface 50 may cause piston assembly 38 to displace to increase the effective length of hydraulic cylinder 16. Similarly, when a force on second hydraulic surface 50 is greater than a force on first hydraulic surface 48, piston assembly 38 will retract within tube 36 to decrease the effective length of hydraulic cylinder 16. A sealing member (not shown), such as an o-ring, may be connected to piston 44 to restrict a flow of fluid between an internal wall of tube 36 and an outer cylindrical surface of piston 44.

Primary source 22 may be configured to produce a flow of pressurized fluid and may include a pump such as, for example, a variable displacement pump, a fixed displacement pump, a variable flow pump, or any other source of pressurized fluid known in the art. Primary source 22 may be drivably connected to a power source (not shown) of work machine 10 by, for example, a countershaft (not shown), a belt (not shown), an electrical circuit (not shown), or in any other suitable manner. Primary source 22 may be dedicated to supplying pressurized fluid only to hydraulic system 20, or alternately may supply pressurized fluid to multiple hydraulic systems within work machine 10.

Head-end supply valve 24 may be disposed between primary source 22 and first chamber 40 and configured to regulate a flow of pressurized fluid to first chamber 40. Specifically, head-end supply valve 24 may include a two-position spring-biased valve element that is solenoid-actuated and configured to move between a first position at which fluid is allowed to flow into first chamber 40 and a second position at which fluid flow from first chamber 40 is blocked. It is contemplated that head-end supply valve 24 may include additional or different mechanisms such as, for example, a proportional valve element, one or more restricted orifices, a pilot valve element, a pressure relief valve element, or any other valve mechanisms known in the art. It is also contemplated that head-end supply valve 24 may alternately be hydraulically-actuated, mechanically-actuated, pneumatically-actuated, or actuated in any other suitable manner. It is further contemplated that head-end supply valve 24 may be configured to allow fluid from first chamber 40 to flow through head-end supply valve 24 during a regeneration event when a pressure within first chamber 40 exceeds a pressure of the fluid supplied by primary source 22.

Head-end drain valve 26 may be disposed between first chamber 40 and tank 32 and configured to regulate a flow of pressurized fluid from first chamber 40 to tank 32. Specifically, head-end drain valve 26 may include a three-position spring-biased pilot valve element 52, a two-position hydraulically-actuated spring-biased main valve element 54 that is mechanically connected to pilot valve element 52 by way of a spring 56 and fluidly connected to pilot valve element 52 by a fluid passageway 58, and a hydraulically-actuated spring-biased pilot relief valve element 60 that is fluidly connected to main valve element 54 by way of a fluid passageway 62. Pilot valve element 52 may be solenoid-actuated and configured to move between a first position at which fluid from pilot source 34 is allowed to act on pilot valve element 52 and main valve element 54 via fluid passageways 64, 66, and 68, a second position at which the fluid acting on pilot valve element 52 and main valve element 54 is allowed to drain to tank 32 via a drain passageway 70, and a third position at which all fluid through pilot valve element 52 is blocked. Restricted orifices 72 and 74 may be disposed within fluid passageways 66 and 68, respectively, to reduce pressure and/or flow oscillations. It is contemplated that restricted orifices 72 and 74 may be omitted, if desired. Main valve element 54 may be hydraulically-actuated and configured to move between a first position at which fluid from first chamber 40 is allowed to drain to tank 32 via fluid passageways 76 and 78 and a second position where fluid from first chamber 40 is blocked. Main valve element 54 may be biased via fluid within a passageway 80 in a direction opposite the direction caused by fluid within passageway 58. A restricted orifice 82 may be disposed within a fluid passageway 84 that connects pilot source 34 to one end of main valve element 54. Pilot relief valve element 60 may be biased via fluid from first chamber 40 toward a flow-passing position to thereby communicate pressurized fluid from first chamber 40 with fluid passageways 80 and 84. A one-way pressure bypass valve 85 may also be included within head-end drain valve 26 to relieve pressures from between pilot valve element 52 and main valve element 54 during situations where pilot relief valve element 60 has initiated motion of main valve element 54, but pilot valve element 52 is blocking fluid passageway 64 and drain passageway 70.

Rod-end supply valve 28 may be disposed between primary source 22 and second chamber 42 and configured to regulate a flow of pressurized fluid to second chamber 42. Specifically, rod-end supply valve 28 may include a two-position spring-biased valve element that is solenoid-actuated and configured to move between a first position at which fluid is allowed to flow into second chamber 42 and a second position at which fluid is blocked from second chamber 42. It is contemplated that rod-end supply valve 28 may include additional or different valve mechanisms such as, for example, a proportional valve element, one or more restricted orifices, a pilot valve element, a pressure relief valve element, or any other valve mechanism known in the art. It is also contemplated that rod-end supply valve 28 may alternately be hydraulically-actuated, mechanically-actuated, pneumatically-actuated, or actuated in any other suitable manner. It is further contemplated that rod-end supply valve 28 may be configured to allow fluid from second chamber 42 to flow through rod-end supply valve 28 during a regeneration event when a pressure within second chamber 42 exceeds a pressure of the fluid supplied by primary source 22.

Rod-end drain valve 30 may be disposed between second chamber 42 and tank 32 and configured to regulate a flow of pressurized fluid from second chamber 42 to tank 32. Specifically, rod-end drain valve 30 may include a three-position spring-biased pilot valve element 86, a two-position hydraulically-actuated spring-biased main valve element 88 that is mechanically connected to pilot valve element 86 by way of a spring 90 and fluidly connected to pilot valve element 86 via a fluid passageway 92, and a hydraulically-actuated spring-biased pilot relief valve element 94 that is fluidly connected to main valve element 88 by way of fluid passageway 96. Pilot valve element 86 may be solenoid-actuated and configured to move between a first position at which fluid from pilot source 34 is allowed to act on pilot valve element 86 and main valve element 88 via fluid passageways 98, 100, and 102, a second position at which the fluid acting on pilot valve element 86 and main valve element 88 is allowed to drain to tank 32 via a drain passageway 104, and a third position at which all fluid through pilot valve element 86 is blocked. Restricted orifices 106 and 108 may be disposed within fluid passageways 100 and 102, respectively, to reduce pressure and/or flow oscillations. It is contemplated that restricted orifices 106 and 108 may be omitted, if desired. Main valve element 88 may be hydraulically-actuated and configured to move between a first position at which fluid from second chamber 42 is allowed to drain to tank 32 via fluid passageways 110 and 112, and a second position where fluid from second chamber 42 is blocked. Main valve element 88 may be biased via fluid within a passageway 114 in a direction opposite the direction caused by fluid within passageway 92. A restricted orifice 116 may be disposed within a fluid passageway 118 that connects pilot source 34 to one end of main valve element 88. Pilot relief valve element 94 may be biased via fluid from second chamber 42 toward a flow-passing position to thereby communicate pressurized fluid from second chamber 42 with fluid passageway 96. A one-way pressure bypass valve 119 may also be included within rod-end drain valve 30 to relieve pressures from between pilot valve element 86 and main valve element 88 during situations where pilot relief valve element 94 has initiated motion of main valve element 88, but pilot valve element 86 is blocking fluid passageway 98 and drain passageway 104.

Head-end and rod-end supply and drain valves 24–30 may be fluidly interconnected. In particular, head-end and rod-end supply valves 24, 28 may be connected in parallel to a common upstream fluid passageway 120. Head-end supply and return valves 24, 26 may be connected in parallel to a common first chamber fluid passageway 122. Rod-end supply and drain valves 28, 30 may be connected in parallel to a common second chamber fluid passageway 124.

Tank 32 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 32. It is also contemplated that hydraulic system 20 may be connected to multiple separate fluid tanks.

Pilot source 34 may be configured to produce a flow of pressurized fluid and may include a pump such as, for example, a variable displacement pump, a fixed displacement pump, a variable flow pump, or any other source of pressurized fluid known in the art. Pilot source 34 may be drivably connected to a power source (not shown) of work machine 10 by, for example, a countershaft (not shown), a belt (not shown), an electrical circuit (not shown), or in any other suitable manner. Pilot source 34 may be dedicated to supplying pressurized pilot fluid only to hydraulic system 20, or alternatively may supply pressurized fluid to multiple hydraulic systems within work machine 10. A pressure relief valve 125 may be associated with pilot source 34 to facilitate a substantially constant pressure within the fluid supplied by pilot source 34.

FIG. 2 also illustrates a control system 140 in communication with hydraulic system 20. Control system 140 may include a controller 142, a first pressure sensor 144, and a second pressure sensor 146. Controller 142 may be in communication with first pressure sensor 144, second pressure sensor 146, pilot valve element 52, pilot valve element 86, head-end supply valve 24, and rod-end supply valve 28 via communication lines 148, 150, 152, 154, 156, and 158, respectively. Controller 144 may be configured to receive input from an operator indicative of a desired movement of hydraulic cylinder 16 and to selectively actuate pilot valve elements 52 and 86 and head and rod-end supply valves 24 and 26 in response to the input to achieve the desired movement. Controller 144 may further be configured to sense the pressure of the fluid within first and second chambers 40 and 42 and to actuate pilot valve elements 52 and 86 in response the pressure exceeding a predetermined pressure.

Figure 3:
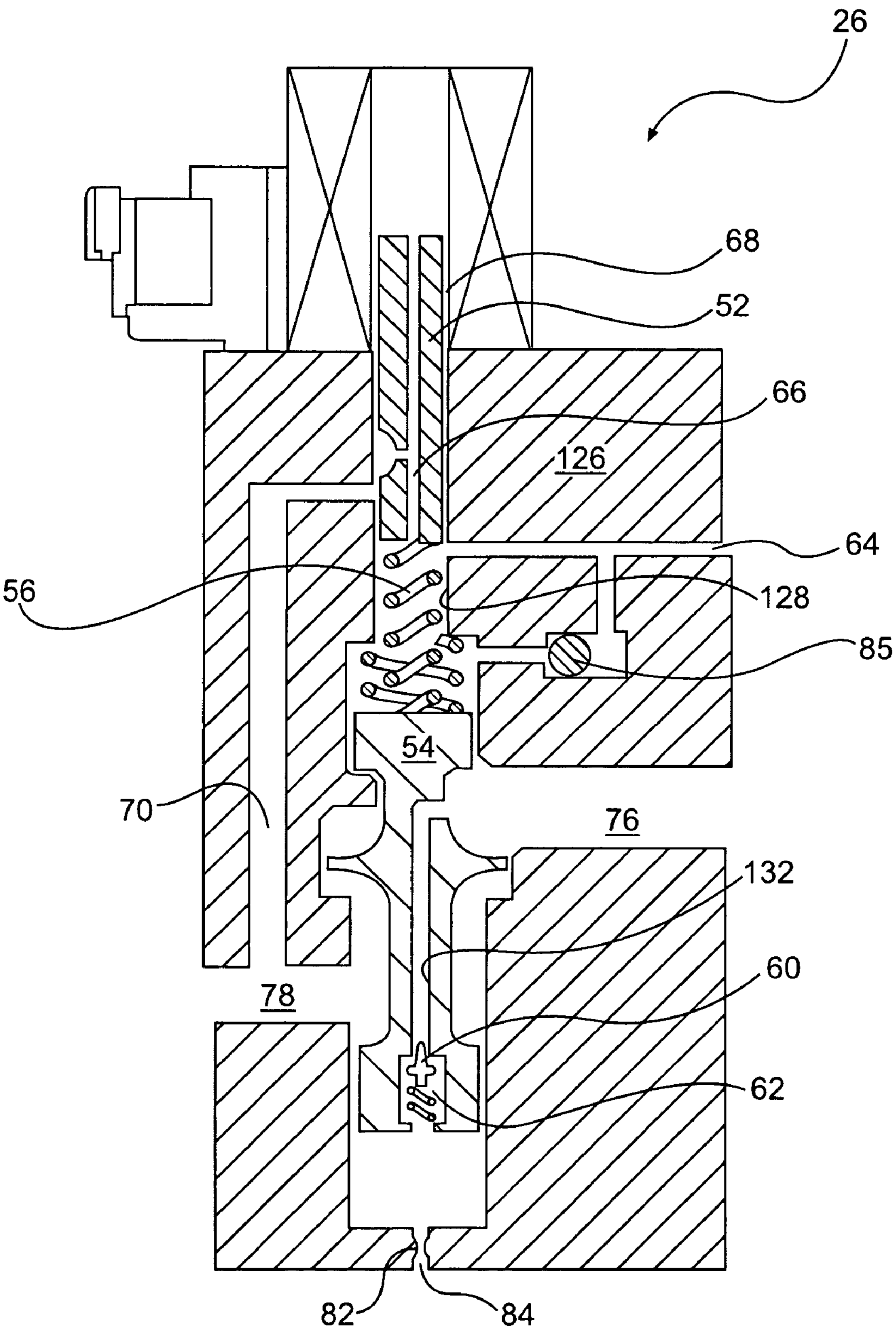
FIG. 3 is a cross-sectional illustration of an exemplary disclosed drain valve for the hydraulic circuit of FIG. 2.
Figure 4:
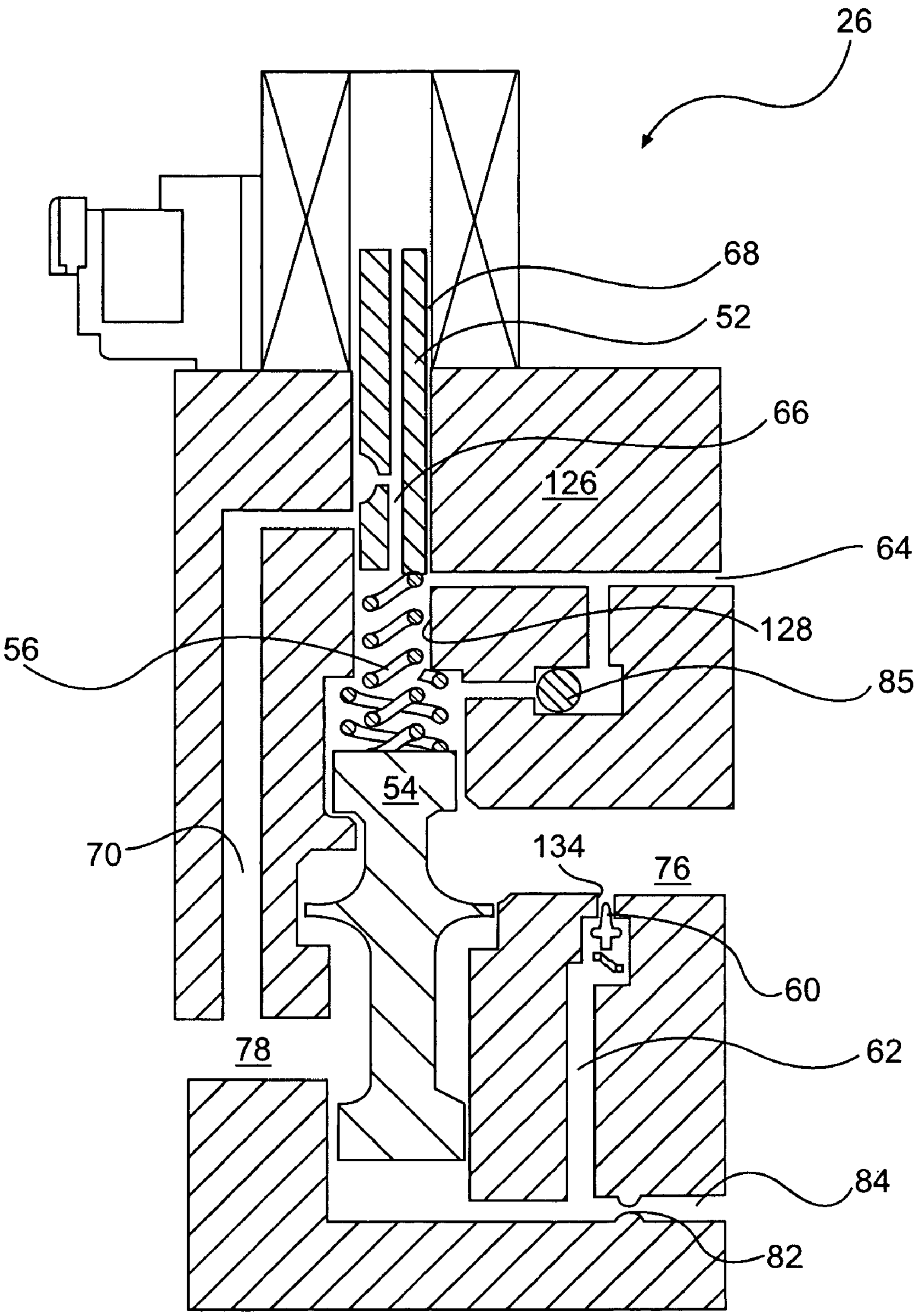
FIG. 4 is a cross-sectional illustration of another exemplary disclosed drain valve for the hydraulic circuit of FIG. 2.

FIGS. 3 and 4 illustrate alternate locations for pilot relief valve elements 60 and 94 within head and rod-end drain valves 26 and 30. Because both head and rod-end drain valves 26 and 30 are substantially identical and for purposes of simplicity, the reference numbers for only head-end drain valve 26 will be used in the description of FIGS. 3 and 4.

As illustrated in FIG. 3, head-end drain valve 26 may include a valve body 126 having a central bore 128. Pilot valve element 52 may be disposed within central bore 128 and slidably movable between the flow-blocking position and the flow-passing position where fluid passageway 64 and drain passageway 70 are fluidly communicated. Main valve element 54 may also be disposed within central bore 128 and slidably movable between the flow-blocking position and the flow-passing position to fluidly communicate passageways 76 and 78. Pilot relief valve element 60 may be disposed within and axially aligned with a bore 132 of main valve element 54 and slidably movable between the flow-blocking position and the flow-passing position to fluidly communicate fluid passageway 76 with fluid passageway 84 and one end of main valve element 54.

Similar to FIG. 3, head-end drain valve 26 of FIG. 4 may include pilot valve element 52 and main valve element 54 disposed within central bore 128 of valve body 126 to selectively connect fluid passageway 64 to drain passageway 70 and fluid passageway 76 to fluid passageway 78. However, in contrast to FIG. 3, pilot relief valve element 60 of FIG. 4 is not located within a bore of main valve element 54. Instead, pilot relief valve element 60 of FIG. 4 may be disposed within a bore 134 that is radially removed from main valve element 54 and located within valve body 126.

INDUSTRIAL APPLICABILITY

The disclosed hydraulic system may be applicable to any work machine that includes a fluid actuator where the benefits of hydraulically actuated and electrically actuated drain valves are desired. The disclosed hydraulic system may provide precise control over fluid flow to the fluid actuator, high response pressure limiting, and fail safe pressure limiting for the components of the hydraulic system in a low-cost space-saving configuration. The operation of hydraulic system 20 will now be explained.

As illustrated in FIG. 2, hydraulic cylinder 16 may be movable by fluid pressure in response to an operator input. Fluid may be pressurized by primary source 22 and selectively directed to head-end and rod-end supply valves 24 and 28. In response to an operator input to either extend or retract piston assembly 38 relative to tube 36, controller 142 may direct the pressurized fluid to the appropriate one of first and second chambers 40, 42 by causing one of head-end and rod-end supply valves 24 and 28 to move to the flow-passing position. Substantially simultaneously, controller 142 may actuate the appropriate one of main valve element 54 or 88 of head-end and rod-end drain valves 26, 30 to direct fluid from the appropriate one of the first and second chambers 40, 42 to tank 32, thereby creating a force imbalance on piston 44 that causes piston assembly 38 to move. For example, if an extension of hydraulic cylinder 16 is requested, head-end supply valve 24 may be moved to the open position to direct pressurized fluid from primary source 22 to first chamber 40. Substantially simultaneous to the directing of pressurized fluid to first chamber 40, main valve element 88 of rod-end drain valve 30 may be moved to the open position to allow fluid from second chamber 42 to drain to tank 32. If a retraction of hydraulic cylinder 16 is requested, rod-end supply valve 28 may be moved to the open position to direct pressurized fluid from primary source 22 to second chamber 42. Substantially simultaneous to the directing of pressurized fluid to second chamber 42, main valve element 54 of head-end drain valve 26 may be moved to the open position to allow fluid from first chamber 40 to drain to tank 32.

Movement of main valve elements 54 and 88 may be affected in at least two ways (because main valve element 88 functions substantially identical to main valve element 54 and for purposes of simplicity, only the movement with respect to main valve element 54 will be described). An electronic signal from controller 142 may be received via communication line 152 by the solenoid associated with head-end drain valve 26 that causes the solenoid to energize. Upon actuation of the solenoid, pilot valve mechanism 52 may be magnetically repelled away from the solenoid, thereby communicating cylinder bore 128 with drain passageway 70 via fluid passageway 66, allowing the fluid within cylinder bore 128 to drain to tank 32. Because the opposite end of main valve element 54 is simultaneously exposed to pressurized fluid from pilot source 34 via fluid passageway 84, main valve element 54 may be urged toward pilot valve element 52 by an imbalance of force, thereby communicating fluid passageways 76 and 78 allowing fluid from first chamber 40 to drain to tank 32. The signal from controller 142 causing the solenoid of head-end drain valve 26 may be generated in response to operator input or in response to a pressure within hydraulic cylinder 16 being above a predetermined pressure, as measured by pressure sensor 144. Movement of main valve elements 54 and 88 may also be affected when excessive pressures within first chamber 40 cause pilot relief valve element 60 to move to the flow-passing position, allowing the excessive pressures of first chamber 40 to exert force on one end of main valve element 54. Because the opposite end of main valve element 54 is simultaneously exposed to a lower fluid pressure from pilot source 34, an imbalance of force on main valve element 54 is created that urges main valve element 54 towards pilot valve element 52, again communicating fluid passageways 76 and 78 and allowing the fluid from first chamber 40 to drain to tank 32. During movement of main valve element 54 initiated by movement of pilot relief valve element 60 toward the flow passing position, fluid may be allowed to exit central bore 128 past pressure bypass valve 85 to prevent hydraulic lock.

Because the movement of main valve elements 54 and 88 may be affected electronically, hydraulic system 20 may be precisely controllable. Specifically, opening and closing pressures and flow rates of fluid in communication with main valve elements 54 and 88 may be closely tailored to accommodate a variety of different operating conditions. This tailoring may be software facilitated and implemented with an electronic controller (not shown) to provide system-wide optimization and improved efficiency.

Because the movement of main valve elements 54 and 88 may also be affected hydraulically, hydraulic system 20 may be able to respond to rising fluid pressures and fluid pressure spikes quickly and may provide fail safe pressure relief for hydraulic system 20. In particular, a hydraulically actuated valve mechanism may respond on the order of 5–15 μs, while an electronically actuated valve mechanism may respond much slower, typically on the order of about 100 μs. The increased responsiveness of the hydraulically actuated main valve elements 54 and 88 may help to prevent potentially damaging pressure fluctuations that an electronic-only system might not be able to avoid. Further, even in situations of electronic failure or during power system shutdown, the movement of pilot relief valve element 60 may still cause movement of main valve element 54 from the flow-blocking position to the flow-passing position, thereby providing fail safe protection for hydraulic system 20 that electronic-only valve configurations can not provide.

In addition, because the electronic relief function and the hydraulic relief functions can be embodied into a single valve configuration rather than completely separate stand-alone valve mechanisms, both cost and space savings may be realized. Further space savings may be realized when pilot relief valve elements 60 and 94 are disposed within main valve elements 54 and 88, rather than in separate bores within valve body 126.

It will be apparent to those skilled in the art that various modifications and variations can be made to the disclosed electro-hydraulic valve. Other embodiments will be apparent to those skilled in the art from consideration of the specification and practice of the disclosed electro-hydraulic valve. For example, it is contemplated that the solenoid actuation of pilot valve elements 52 and 86 may alternatively include a pull-type actuation where energizing the solenoid attracts pilot valve elements 52 and 86 toward the solenoid rather than repelling. It is further contemplated that pilot valve elements 52 and 86 may be omitted, if desired, and main valve elements 54 and 88 directly acted upon by the solenoids. It is intended that the specification and examples be considered as exemplary only, with a true scope being indicated by the following claims and their equivalents.

What is claimed is:

1. A valve for a fluid circuit, comprising:

a main valve element having a first end and a second end and being movable between a flow-passing and a flow-blocking position in response to fluid pressure exerted on the first and second ends;

a solenoid mechanism operatively associated with the main valve element to move the main valve element toward one of the flow-passing and the flow-blocking positions;

a main valve spring configured to bias the main valve element in opposition to movement caused by the solenoid mechanism; and a relief valve element configured to communicate a fluid with the first end of the main valve element in response to a fluid pressure to initiate movement of the main valve element.

2. The valve of claim 1, wherein the main valve element is movable toward the flow-passing position in response to the fluid pressure being above a predetermined pressure.

3. The valve of claim 1, wherein the relief valve element communicates the fluid with the first end of the main element in response to the pressure of the communicated fluid being above a predetermined pressure.

4. The valve of claim 1, wherein the fluid circuit has a hydraulic cylinder and a tank, and the valve further includes:

a first fluid passageway configured to communicate the hydraulic cylinder with the main valve element; and a second fluid passageway configured to communicate the tank with the main valve element, wherein the main valve element being away from the flow-blocking position allows fluid to flow from the hydraulic cylinder to the tank.

5. The valve of claim 4, further including a third fluid passageway communicating the relief valve element with the first end of the main valve element.

6. The valve of claim 1, wherein the fluid circuit also has a pilot source of pressurized fluid and the valve further includes a first fluid passageway communicating the pilot source of pressurized fluid, the relief valve element, and the first end of the main valve element.

7. The valve of claim 6, further including a second fluid passageway selectively communicating the pilot source of pressurized fluid and the second end of the main valve element.

8. The valve of claim 7, further including:

a third fluid passageway selectively communicating the pilot source of pressurized fluid and the second end of the main valve element; and a check valve element disposed within the third fluid passageway to allow one-directional flow from the second end of the main valve element to the second fluid passageway in response to a fluid pressure.

9. The valve of claim 1, further including:

a valve body having a central bore, the main valve element being disposed within the central bore;

a pilot valve element disposed within the central bore and movable by the solenoid mechanism, the central bore fluidly communicating the second end of the main valve element with the pilot valve element; and a spring disposed within the central bore connecting the main valve element to the pilot valve element.

10. The valve of claim 9, further including a fluid passageway disposed within the valve body and configured to selectively fluidly connect an outlet of the pilot valve element with an outlet of the main valve element.

11. The valve of claim 9, wherein the fluid circuit has a tank and the pilot valve element is configured to selectively allow fluid in communication with the second end of the main valve element to drain to the tank when the pilot valve element is in a first flow-passing position.

12. The valve of claim 11, wherein the fluid circuit has a pilot source of pressurized fluid and the pilot valve element is configured to selectively allow the pressurized fluid to flow from the pilot source to the second end of the main valve element when the pilot valve element is in a second flow-passing position.

13. The valve of claim 12, wherein the flow of pressurized fluid from the pilot source to the second end of the main valve element is prevented when the pilot valve is in the first flow-passing position and drainage to the tank is prevented when the pilot valve element is in the second flow-passing position.

14. The valve of claim 9, wherein the relief valve element is disposed within a bore of the main valve element.

15. The valve element of claim 9, wherein the relief valve element is disposed with a bore of the valve body.

16. A method of operating a valve, comprising:

operating a relief valve element to selectively allow pressurized fluid to flow to an end of a main valve element, thereby moving the main valve element between a flow-passing and a flow-blocking position; and operating a solenoid to move the main valve element toward one of the flow-blocking and flow-passing positions in opposition to a spring bias.

17. The method of claim 16, wherein the main valve element is movable toward the flow-passing position in response to the fluid pressure being above a predetermined pressure.

18. The method of claim 16, wherein the relief valve element selectively allows the pressurized fluid to flow in response to the fluid pressure being above a predetermined pressure.

19. The method of claim 16, further including selectively fluidly communicating the main valve element with the hydraulic cylinder and with a tank.

20. The method of claim 16, further including fluidly communicating a pilot source of pressurized fluid with the first end of the main valve element and with the relief valve element.

21. The method of claim 16, wherein operation of the solenoid moves a pilot valve element that is connected to the main valve element by a spring, to thereby move the main valve element.

22. The method of claim 21, further including fluidly communicating an outlet of the pilot valve element and an outlet of the main valve element.

23. The method of claim 21, further including moving the pilot valve element to selectively allow fluid that is in communication with a second end of the main valve element to drain to a tank.

24. The method of claim 23, further moving the pilot valve element to selectively allow pressurized fluid to flow from a pilot source to the first end of the main valve element via a first fluid passageway.

25. The method of claim 24, wherein the flow of pressurized fluid to the first end of the main valve element is prevented when the fluid in communication with the first end of the main valve element is allowed to drain to the tank, and the fluid in communication with first end of the main valve element is prevented from draining to the tank when the pressurized fluid is allowed to flow to the first end of the main valve element.

26. The method of claim 24, further including selectively allowing fluid from the second end of the main valve element to flow-past a check valve within a second fluid passageway into the first fluid passageway.

27. The method of claim 16, wherein the relief valve element is disposed within a bore of the main valve element.

28. The method of claim 16, wherein the relief valve element is disposed with a bore of the valve body.

29. A fluid circuit, comprising:

a hydraulic cylinder;

a pilot source of pressurized fluid;

a tank configured to hold a supply of fluid; and a valve including:

a valve body having a central bore;

a main valve element disposed within the central bore, the main valve element having a first and second end and being movable between a flow-passing and a flow-blocking positions in response to fluid pressure exerted on the first and second ends;

a pilot valve element disposed within the central bore, the central bore fluidly communicating the second end of the main valve element with the pilot valve element;

a spring disposed within the central bore to connect the main valve element to the pilot valve element;

a solenoid mechanism configured to move the pilot valve element, thereby moving the connected main valve element toward one of the flow-passing and the flow-blocking positions;

a main valve spring configured to bias the main valve element in opposition to movement caused by the solenoid mechanism;

a relief valve element configured to communicate a fluid with the first end of the main valve element in response to a pressure of the communicated fluid, the pressure of the communicated fluid initiating movement of the main valve element;

a first fluid passageway configured to communicate fluid from the hydraulic cylinder and the main valve element;

a second fluid passageway configured to communicate the main valve element with the tank, wherein the main valve element being away from the flow-blocking position allows the fluid to flow from the hydraulic cylinder to the tank; and a third fluid passageway communicating the relief valve element with the first end of the main valve element.

30. The fluid circuit of claim 29, wherein the valve further includes:

a fourth fluid passageway communicating the pilot source of pressurized fluid, the relief valve element and the first end of the main valve element;

a fifth fluid passageway selectively communicating the pilot source of pressurized fluid and the second end of the main valve element;

a sixth fluid passageway selectively communicating the pilot source of pressurized fluid and the second end of the main valve element;

a check valve element disposed within the sixth fluid passageway to allow one-directional flow from the second end of the main valve element to the fifth fluid passageway in response to a fluid pressure; and a seventh fluid passageway disposed within the valve body and configured to selectively communicate an outlet of the pilot valve element with an outlet of the main valve element, wherein the pilot valve element is configured to selectively allow fluid in communication with the second end of the main valve element to drain to the tank when the pilot valve element is in a first flow-passing position and to selectively allow the pressurized fluid to flow from the pilot source to the second end of the main valve element when the pilot valve element is in a second flow-passing position.

31. The fluid circuit of claim 30, wherein the flow of pressurized fluid from the pilot source to the second end of the main valve element is prevented when the pilot valve is in the first flow-passing position, and drainage to the tank is prevented when the pilot valve element is in the second flow-passing position.

32. The fluid circuit of claim 29, wherein the relief valve element is disposed within a bore of the main valve element.

33. The fluid circuit of claim 29, wherein the relief valve element is disposed with a bore of the valve body.

34. The fluid circuit of claim 29, further including at least one pressure sensor configured to sense a pressure of fluid within the hydraulic cylinder and to actuate the solenoid mechanism in response to the pressure.

* * * * *